United States Patent [19]

Muto

[11] Patent Number: 5,630,218
[45] Date of Patent: May 13, 1997

[54] RADIO RECEIVING DEVICE FOR MEASURING AN ELECTRIC FIELD LEVEL OF A RECEIVING CHANNEL AND ADJACENT CHANNELS USING COMMON COMPONENTS

[75] Inventor: Hiroyasu Muto, Tokyo, Japan

[73] Assignee: NEC Corporation, Tokyo, Japan

[21] Appl. No.: 275,407

[22] Filed: Jul. 15, 1994

[30] Foreign Application Priority Data

Jul. 21, 1993 [JP] Japan .................................. 5-180414

[51] Int. Cl.⁶ .................................................. H04B 17/00
[52] U.S. Cl. ...................... 455/226.2; 455/67.3; 455/307
[58] Field of Search ........................... 455/33.1, 54.1, 455/56.1, 67.1, 67.3, 226.2, 226.3, 307, 89

[56] References Cited

U.S. PATENT DOCUMENTS

| | | | |
|---|---|---|---|
| 4,701,934 | 10/1987 | Jasper | 375/1 |
| 4,890,332 | 12/1989 | Takahashi | 455/67.3 |
| 5,148,548 | 9/1992 | Meche et al. | 455/67.3 |
| 5,323,391 | 6/1994 | Harrison | 455/307 |
| 5,390,365 | 2/1995 | Enoki et al. | 455/226.2 |
| 5,410,733 | 4/1995 | Niva et al. | 455/226.2 |

FOREIGN PATENT DOCUMENTS

| | | |
|---|---|---|
| 61-256839 | 11/1986 | Japan . |
| 63-177630 | 7/1988 | Japan . |

*Primary Examiner*—Edward F. Urban
*Attorney, Agent, or Firm*—Foley & Lardner

[57] ABSTRACT

Received signals are converted into IF signals by a frequency converter. The IF signals are caused to pass through a band-pass filter having a pass band width including a receiving channel and adjacent channels of higher- and lower-frequencies. The resultant signals are then converted into digital signals by an A/D converter. The digital signals are stored in a memory. The pass band of a variable frequency digital filter serving as a digital processing circuit is sequentially switched to the receiving channel and the adjacent channels, and the received signal data stored in the memory are read out and caused to pass through the variable frequency digital filter for each channel. The electric field levels of the received signals from the receiving channel and the adjacent channels are sequentially calculated by an electric field level measuring circuit by using outputs from the variable frequency digital filter or a demodulator connected to the output terminal of the filter.

14 Claims, 9 Drawing Sheets

PRIOR ART

FIG. 3

PRIOR ART

RADIO RECEIVING DEVICE FOR MEASURING AN ELECTRIC FIELD LEVEL OF A RECEIVING CHANNEL AND ADJACENT CHANNELS USING COMMON COMPONENTS

BACKGROUND OF THE INVENTION

1. Field of the Invention

The present invention relates to a radio receiving device suitable for mobile communication and, more particularly, to a radio receiving device which can be used in either or both of a base station and a mobile station to measure electric field level of a receiving channel and adjacent channels.

2. Description of the Prior Art

For example, in a radio receiving device for mobile communication, in order to evaluate the quality of communication, the electric field levels of a receiving channel and adjacent channels of higher- and lower-frequencies are measured. For example, in a base station for a mobile communication system, in order to evaluate the quality of communication between the base station and a given mobile station, the electric field levels of a radio wave transmitted from the mobile station on the receiving channel and the adjacent channels of higher- and lower-frequencies are measured. The same operation may be performed in a mobile station in the mobile communication system.

Figure 1:
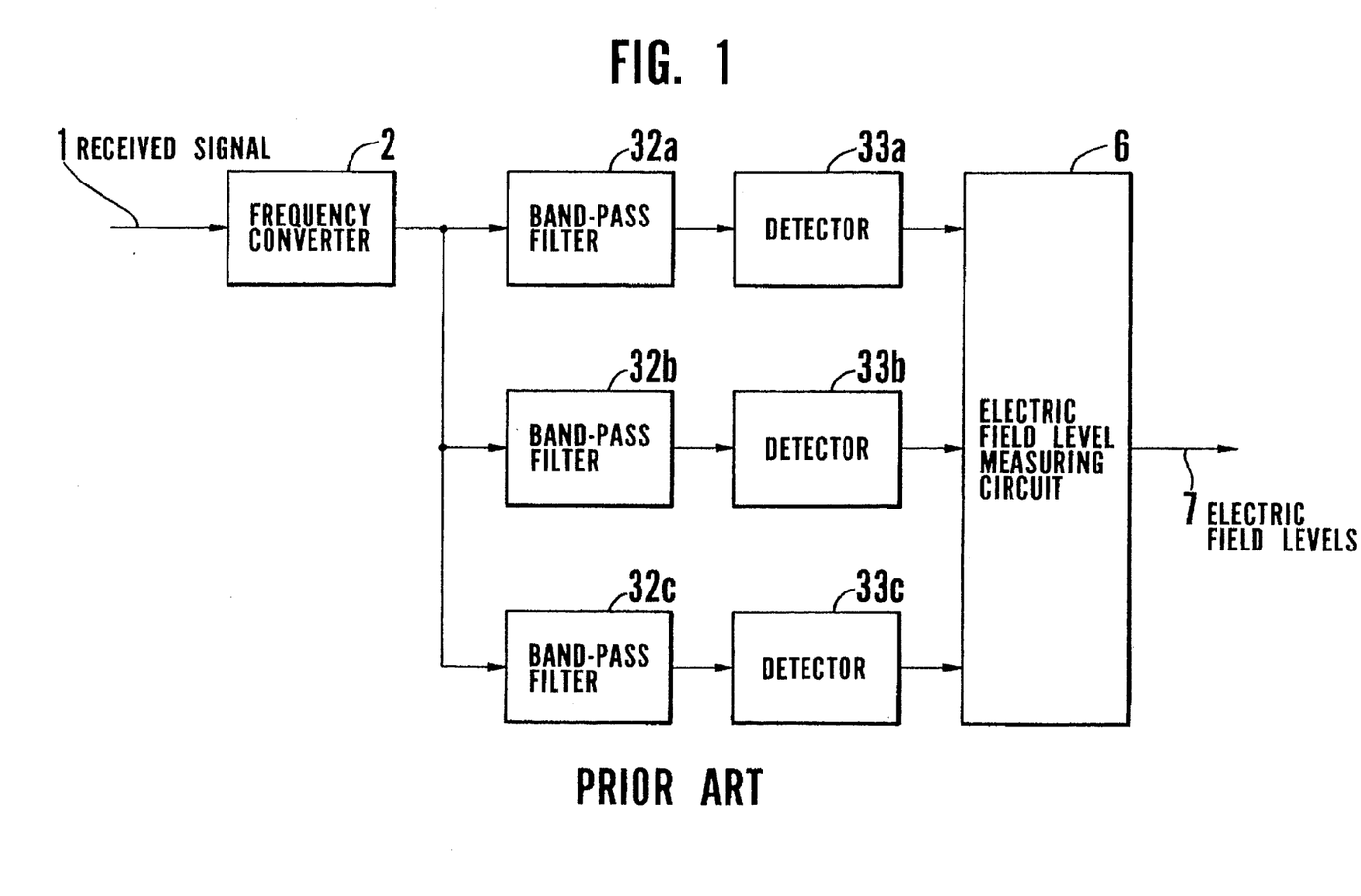
FIG. 1 is a block diagram showing a conventional radio receiving device.
Figure 2:
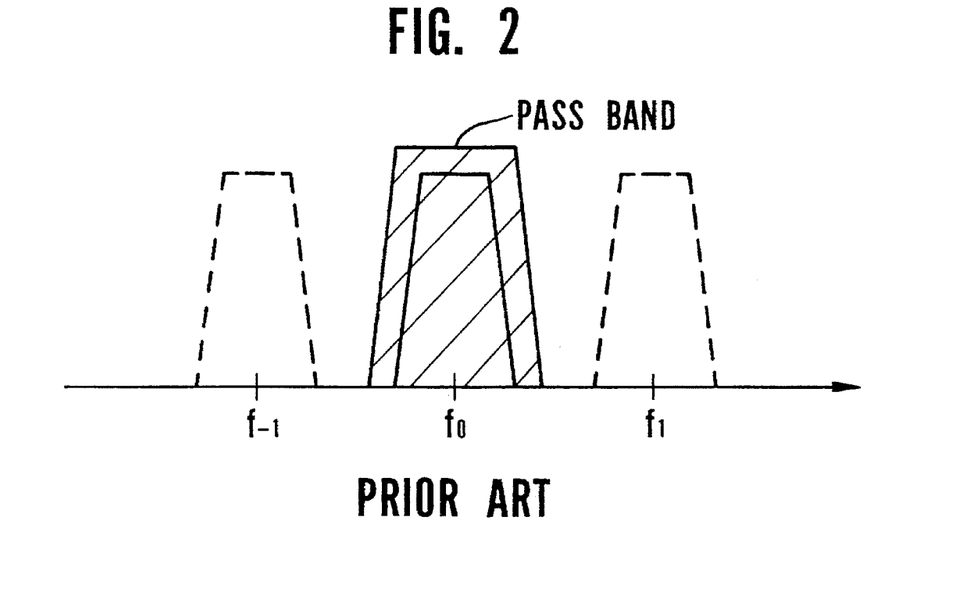
FIG. 2 is a graph showing the characteristics of a band-pass filter for filtering a signal transmitted through a channel in the conventional radio receiving device in FIG. 1.

FIG. 1 is a block diagram showing a conventional radio receiving device disclosed in Japanese Unexamined Patent Publication No. SHO 61-256839. FIG. 2 shows the characteristics of a band-pass filter designed to filter a wave transmitted through a receiving channel in the device.

This radio receiving device includes a frequency converter 2 for converting the frequency of a received signal into a lower-frequency, i.e., an IF (intermediate frequency), a band-pass filter 32a for filtering only a signal on a receiving channel to be demodulated, and band-pass filters 32b and 32c for filtering only signals on adjacent channels. The radio receiving device measures the electric field levels of the respective channels by detecting the filtered signals using detectors 33a to 33c.

Figure 3:
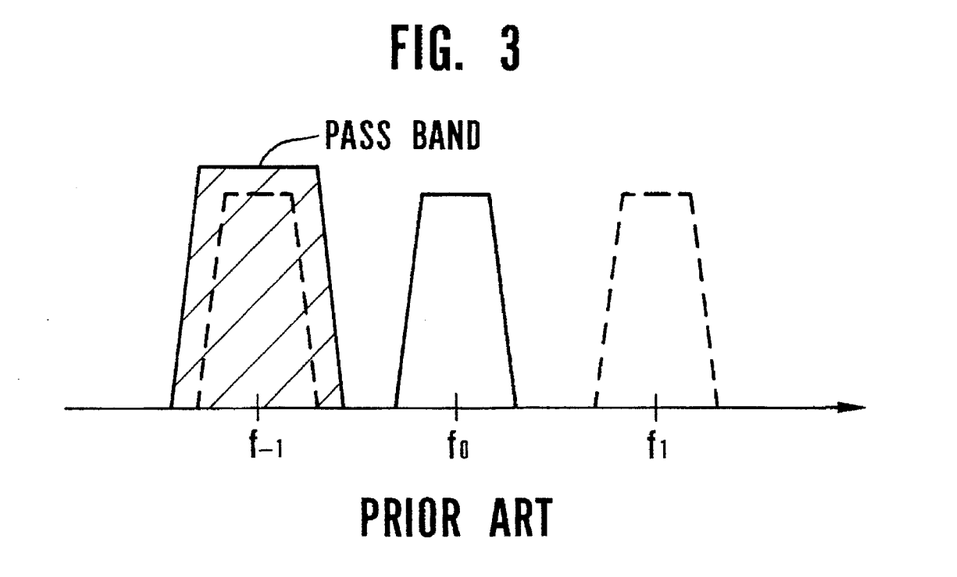
FIG. 3 is a graph showing the characteristics of a band-pass filter for filtering a signal transmitted through an adjacent channel in the conventional radio receiving device in FIG. 1.
Figure 4:
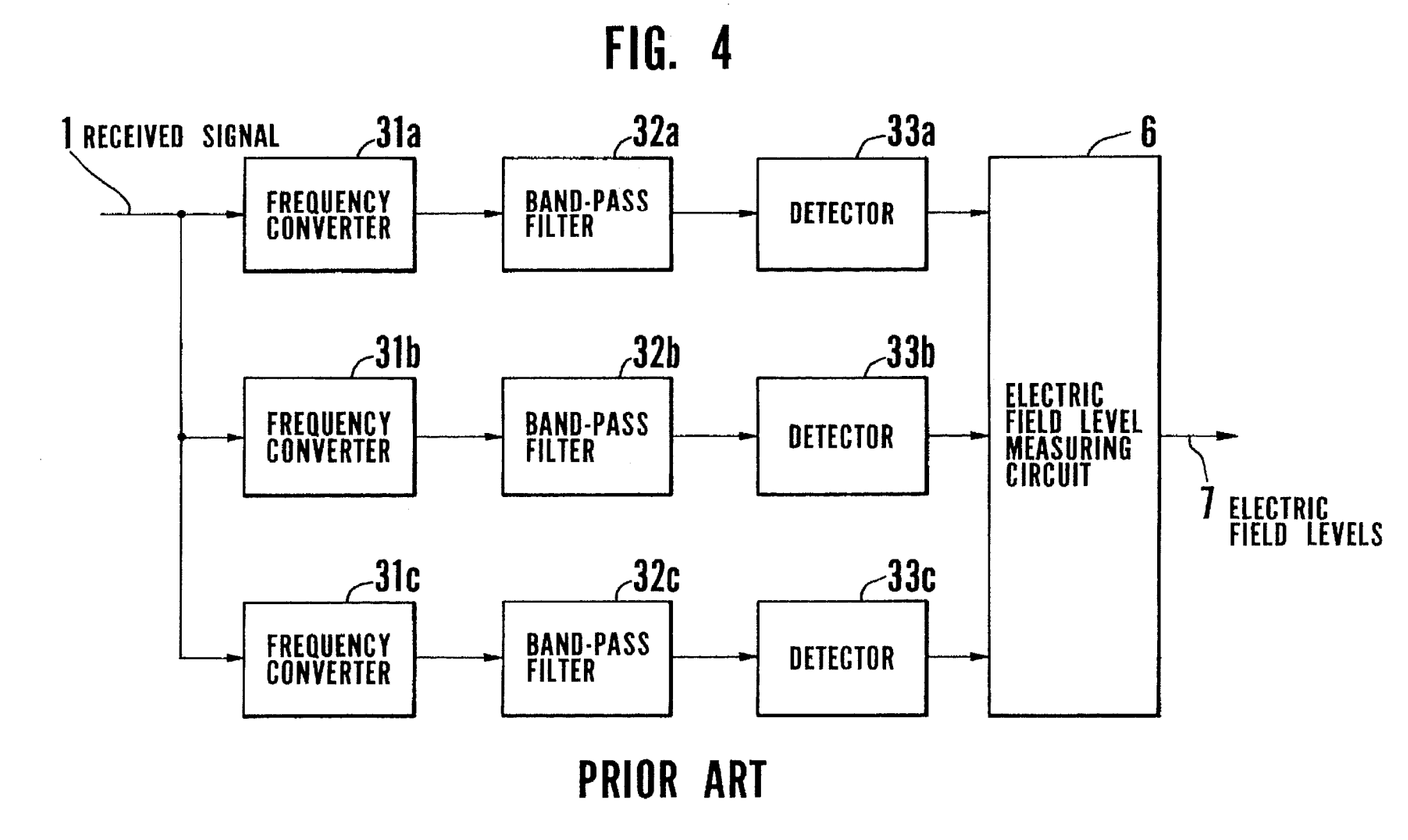
FIG. 4 is a block diagram showing another conventional radio receiving device.

FIG. 4 is a block diagram showing another conventional radio receiving device disclosed in Japanese Unexamined Patent Publication No. SHO 63-177630. FIG. 3 shows the characteristics of a band-pass filter designed to filter a radio wave on an adjacent channel of lower frequency.

In addition to a frequency converter 31a for converting the frequency of a radio wave on a receiving channel into a lower-frequency, i.e., an IF, this radio receiving device includes other frequency converters 31b and 31c for converting the frequencies of radio waves on adjacent channels into lower-frequencies, i.e., IFs. The device measures the electric field levels of radio waves on the receiving and the adjacent channels by means of the band-pass filters 32a, 32b, and 32c.

Such a conventional radio receiving device includes not only a band-pass filter and detector for a receiving channel but also band-pass filters and detectors for adjacent channels, and it includes not only a frequency converter, a band-pass filter, and a detector for a receiving channel but also frequency converters, band-pass filters, and detectors for adjacent channels. Consequently, a number of electric components are required, resulting in a large-scale arrangement.

SUMMARY OF THE INVENTION

The present invention has been made to eliminate the above drawbacks, and has as its object to provide a radio receiving device which can measure the electric field levels of electric wave on a receiving channel and adjacent channels with a small number of electric components and a simple circuit arrangement.

According to the present invention, there is provided a radio receiving device including a frequency converter for converting received signals into IF signals, a band-pass filter for passing the IF signals, and demodulation means for demodulating signals transmitted through a receiving channel and adjacent channels of higher- and lower-frequencies than the receiving channel by using output signals from the band-pass filter, characterized in that the band-pass filter and the demodulation means are commonly used for the receiving channel and the adjacent channels, and the device comprises an analog/digital converter for converting output signals from the band-pass filter into digital signals, a digital filter for processing the digital signals, and a control circuit for switching a pass band of the digital filter substantially to the receiving channel and the adjacent channels.

The band-pass filter and the demodulation means, which filter and demodulate IF signals from the first frequency converter, respectively, are commonly used for the receiving channel and the adjacent channels. Output signals from the band-pass filter are converted into digital signals. Switching control is performed for the receiving channel and the adjacent channels by using a digital processing circuit as the demodulation means to filter and demodulate the signals corresponding to the respective channels, thereby measuring the electric field levels of the respective channels. Therefore, the electric field levels of the receiving channel and the adjacent channels can be measured with a small number of electric components and a small-scale arrangement.

DETAILED DESCRIPTION OF THE PREFERRED EMBODIMENTS

The present invention will now be described below with reference to the accompanying drawings.

Figure 5:
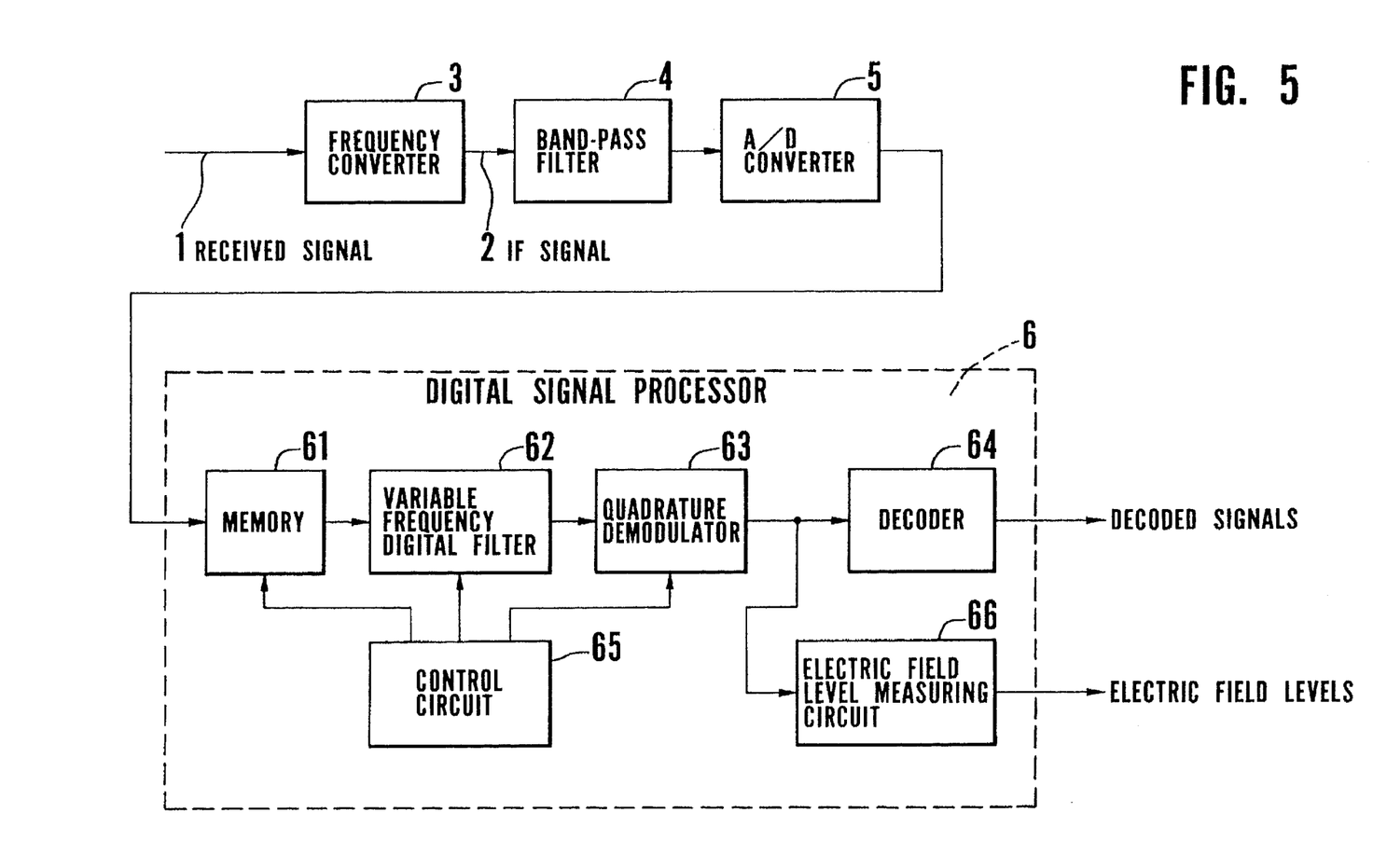
FIG. 5 is a block diagram showing a radio receiving device according to an embodiment of the present invention.

FIG. 5 is a block diagram showing a radio receiving device according to an embodiment of the present invention.

The radio receiving device is constituted by a frequency converter 3, a band-pass filter 4, an A/D converter 5 and a digital signal processor 6. The frequency converter 3 converts a received signal 1 into an IF (intermediate frequency) signal 2. The band-pass filter 4 passes the IF signal 2 of a frequency band including a receiving channel peculiar to the radio receiving device and adjacent channels of higher and lower frequencies than the frequency of the receiving channel. The A/D converter 5 converts an output signal from the band-pass filter 4 into a digital signal. The digital signal processor 6 demodulates received signals from the receiving channel and the adjacent channels and measures the electric field level of the received signal 1.

Figure 6:
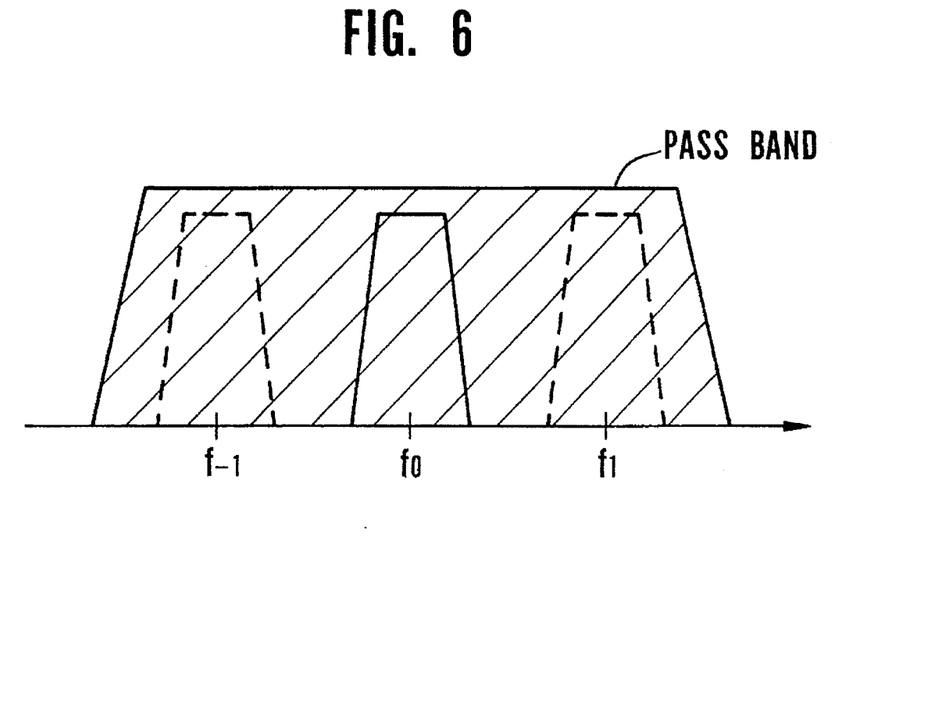
FIG. 6 is a graph showing the characteristics of a band-pass filter of the radio receiving device in FIG. 5.

FIG. 6 shows the pass band characteristics of the band-pass filter 4. As shown in FIG. 6, the pass band of the band-pass filter 4 includes a frequency $f_0$ of the receiving channel to be subjected to modulation, and higher-frequency $f_1$ and lower-frequency $f_{-1}$ of the adjacent channels.

Assume that a sampling rate set in the A/D converter 5 is twice the upper limit of the pass band of IFs according to the sampling theorem.

The digital signal processor 6 is constituted by a memory 61, a variable frequency digital filter 62 such as a transversal filter, a quadrature demodulator 63, a decoder 64, and an electric field level measuring circuit 66. The memory 61 stores received signals on the receiving channel and the adjacent channels of higher- and lower-frequency. The variable frequency digital filter 62 can change its pass band to the receiving channel or the adjacent channels of higher- and lower-frequencies in accordance with a frequency switching signal from a control circuit 65. The quadrature demodulator 63 also changes its local oscillation signal frequency in quadrature demodulation in accordance with the frequency switching signal from the control circuit 65. The decoder 64 determines an output signal from the quadrature demodulator 63 as "1" or "0" on the basis of a proper threshold value. The electric field level measuring circuit 66 measures electric field levels on the basis of output signals from the quadrature demodulator 63. These circuits are preferably integrated into one digital processing circuit.

The following is the characteristic feature of this embodiment. In measuring of the electric field levels the frequency converter 3, the band-pass filter 4, the A/D converter 5, the memory 61, the variable frequency digital filter 62, and the quadrature modulator 63 are commonly used for the receiving channel and the adjacent channels, and the frequencies of the variable frequency digital filter 62 and quadrature demodulator 63 are switched to the receiving channel and the adjacent channels by the control circuit 65.

Measurement of the electric field levels in the radio receiving device shown in FIG. 5 will now be described with reference to FIGS. 7 and 8.

Figure 7:
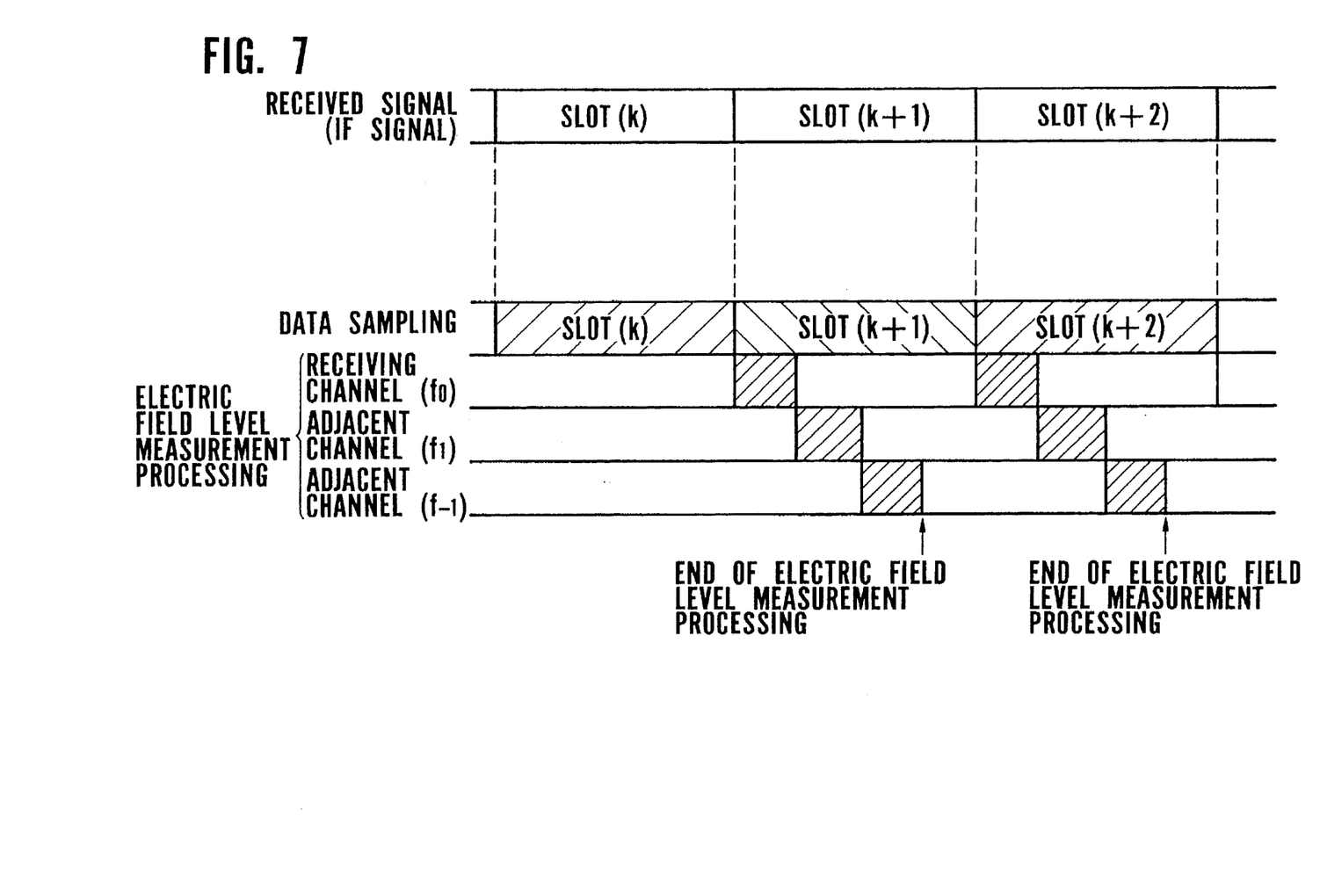
FIG. 7 is a chart showing the timings of data sampling processing and electric field level measurement processing in the present invention.

The received signal 1 is modulated by QAM (Quadrature Amplitude Modulation) or multiple phase-shift keying and constituted by a series of consecutive slots, i.e., slot (k), slot(k+1), slot (k+2), . . . , as shown in FIG. 7. The same is true of the IF signal 2.

Figure 8:
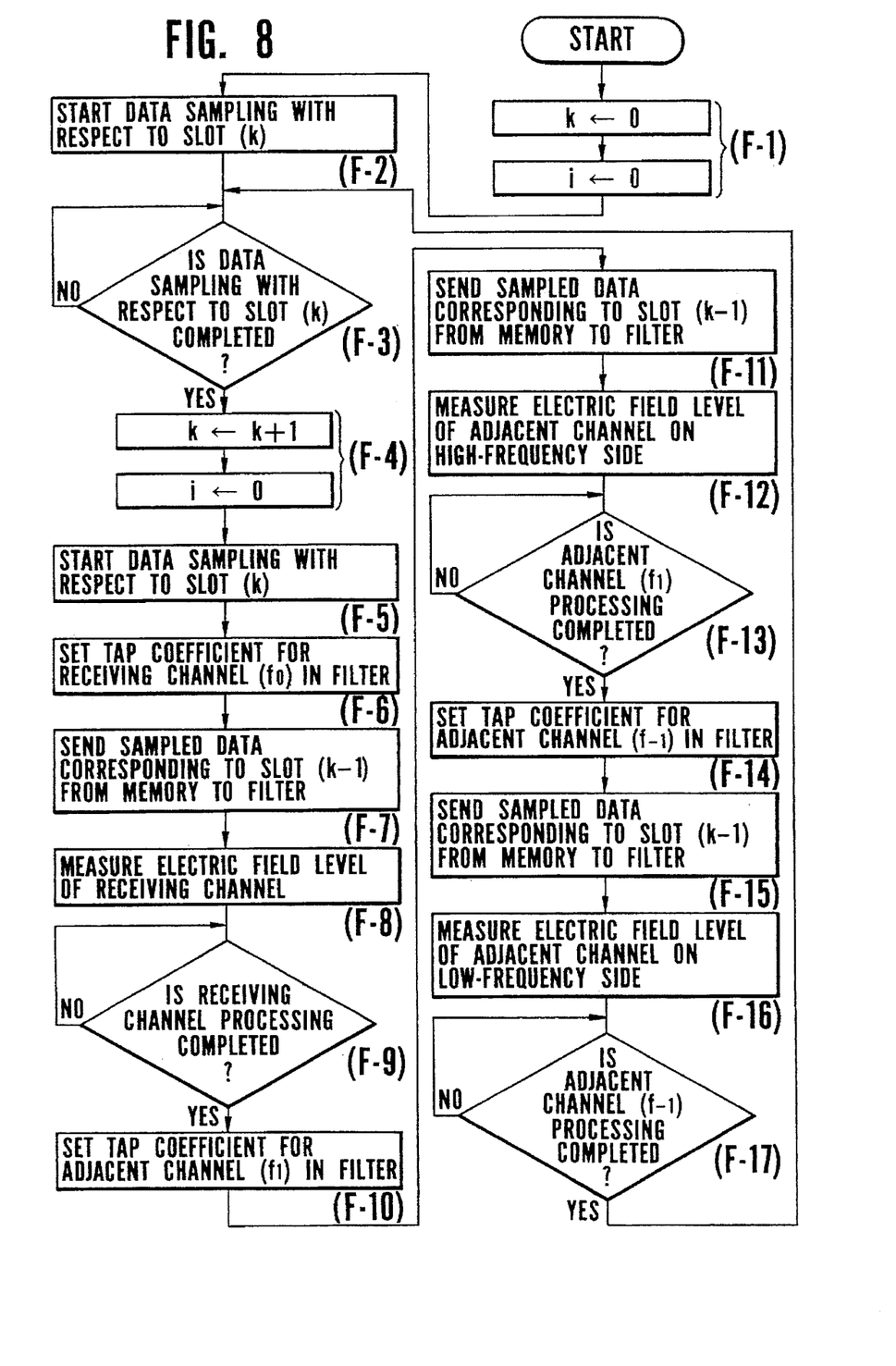
FIG. 8 is a flow chart showing electric field level measurement processing performed by the radio receiving device of the present invention.

FIG. 8 is a flow chart showing measurement processing of electric field level. The electric field level measurement processing for the receiving channel will be described with reference to this flow chart.

Figure 9:
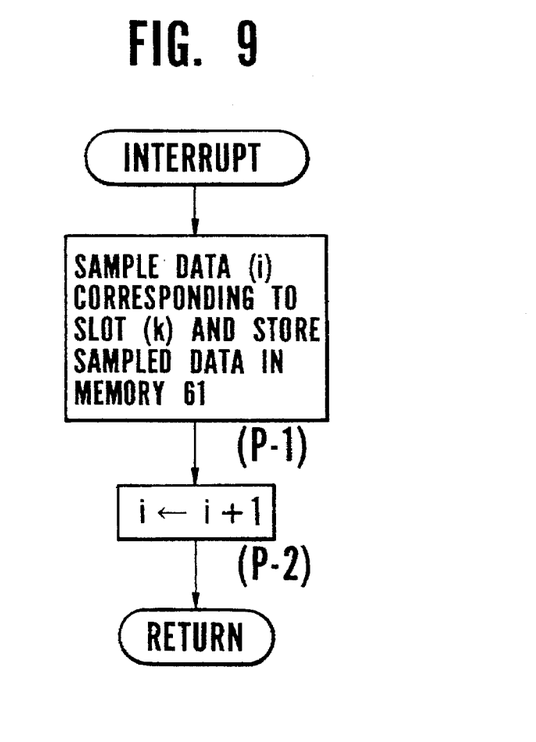
FIG. 9 is a flow chart showing the process of storing data of a received signal in the radio receiving device of the present invention.

After values k and i are initialized (step F-1), sampling of data for slot (k) of the IF signal 2 is started (step F-2) as shown in FIG. 7. More specifically, as shown in FIG. 9, interrupt for data sampling is permitted, and data (i) for the slot (k) is sampled at a sampling rate F, and sampled data S(iT) is stored in the memory 61 of the digital signal processor 6 (step P-1). This data includes pieces of information transmitted through the receiving channel ($f_0$) and the adjacent channels ($f_{-1}$ and $f_{+1}$). The value i is incremented (step P-2), and sampling of data for slot (k) is continued.

When the sampling operation is completed (step F-3), the value k is incremented and the value i is cleared to 0 (step F-4). Thereafter, sampling of data of the signals transmitted through the receiving channel ($f_0$) and the adjacent channels ($f_{-1}$ and $f_{+1}$) for slot (k+1) following slot (k) is started (step F-5). The sampling operation for slot (k+1) is also performed in accordance with the flow chart shown in FIG. 9.

Referring to FIG. 8 again, in order to measure the electric field levels of the received signals on the receiving channel and the adjacent channels of higher- and lower-frequency by using the sampled data for slot (k), the variable frequency digital filter 62 sets a tap coefficient as a frequency switching signal for setting the frequency of the variable frequency digital filter 62 of the digital signal processor 6 to the frequency $f_0$ of the receiving channel (step F-6). Subsequently, the variable frequency digital filter 62 reads out the data for slot (k) from the memory 61 and sends the data to the variable frequency digital filter 62 (step F-7). Since the frequency of the variable frequency digital filter 62 is set to the frequency $f_0$ of the receiving channel, only the data corresponding to the receiving channel, of all the data from the memory 61, can pass through the variable frequency digital filter 62 and is sent to the quadrature demodulator 63.

Measurement of electric field level for the receiving channel ($f_0$) is performed as follows (step F-8).

In the quadrature demodulator 63, baseband signals I(kT) and Q(kT) are obtained from input receiving channel data S(kT) (T=1/sampling frequency F) by digital signal processing. The electric field level measuring circuit 66 calculates the squared sum of a vector X(iT)={I(iT), Q(iT)} on the IQ rectangular coordinate system by using the baseband signals I(kT) and Q(kT) obtained from the quadrature demodulator 63. This squared sum is proportional to the electric field level. That is, the electric field level can be calculated by the following equation:

$$\text{electric field level} = K \cdot 1/n \sum_{i=0}^{n-1} [X(iT)]^2$$
$$= K \cdot 1/n \sum_{i=0}^{n-1} [I(iT)^2 + Q(iT)]^2$$

where n is the number of data sampled for one slot, and k is the constant of proportionality.

When the channel processing for the receiving channel is completed (step F-9), the control circuit 65 sets another tap coefficient as a frequency switching signal (step F-10) to set the frequency of the variable frequency digital filter 62 to the frequency f1 of the adjacent channel of higher-frequency.

The control circuit 65 reads out the data for slot (k) from the memory 61 again and sends the data to the variable frequency digital filter 62 (step F-11). In this case, however, since the pass band of the variable frequency digital filter 62 is set to the adjacent channel ($f_1$) of higher-frequency, only the data for the adjacent channel of higher-frequency is supplied to the quadrature demodulator 63. Electric field level measurement/calculation processing performed by the quadrature demodulator 63 and the electric field level measuring circuit 66 is the same as that for the receiving channel ($f_0$).

When the processing with respect to the adjacent channel ($f_1$) of higher-frequency is completed (step F-13), the control circuit 65 sets still another tap coefficient as a frequency switching signal (step F-14) to set the pass band of the variable frequency digital filter 62 to the lower frequency $f_{-1}$ of the adjacent channel. The control circuit 65 then reads out the data for slot (k) again from the memory 61 and sends the data to the variable frequency digital filter 62 (step F-15). As a result, only the data for the adjacent channel ($f_{-1}$) of lower-frequency passes through the variable frequency digital filter 62 and is sent to the quadrature demodulator 63. Electric field level measurement/calculation processing for the received signal transmitted through the adjacent channel ($f_{-1}$) is the same as that for the received signal from the adjacent channel ($f_1$) of the higher-frequency. When the electric field level measurement processing with respect to the adjacent channel of the lower-frequency is completed, the flow returns to step F-3 to start electric field level measurement processing with respect to the data for next slot (k+1).

Note that baseband signals output from the quadrature demodulator 63 are decoded by the decoder 64 to be output as composite signals.

FIG. 7 shows the timings of the above data sampling processing and electric field level measurement processing.

Figure 10:
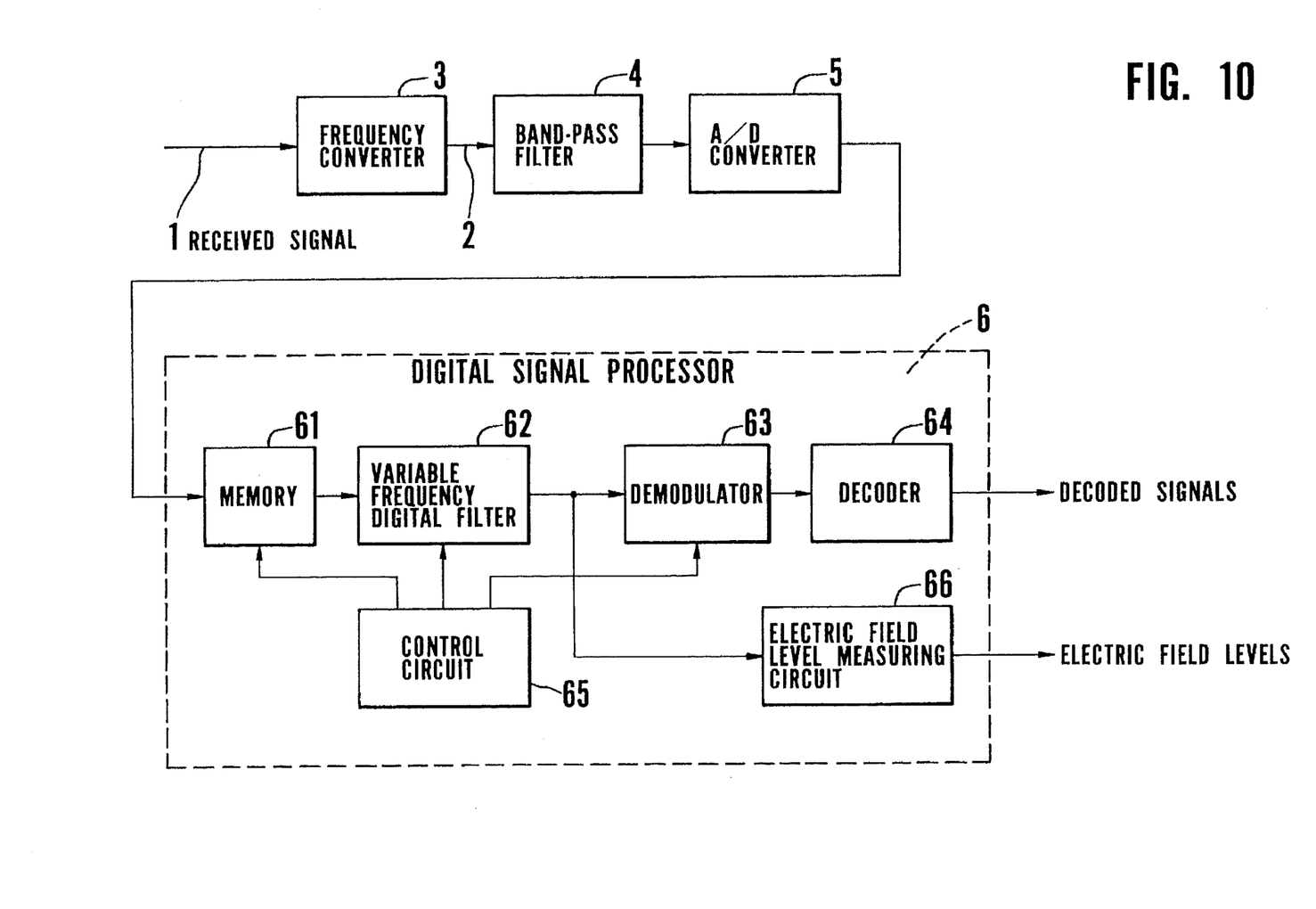
FIG. 10 is a block diagram showing a radio receiving device according to another embodiment of the present invention.

FIG. 10 is a block diagram showing a radio receiving device according to another embodiment of the present invention. The like reference numerals in FIG. 10 denote the like parts as in FIG. 5, and a description thereof will be omitted.

The following is the difference between this embodiment and the first embodiment shown in FIG. 5. In the first embodiment, the quadrature demodulator 63 is used as a demodulator, and electric field levels are measured on the basis of baseband signals output from the demodulator 63. In this embodiment, however, a quadrature demodulator 63 can be any type of demodulator as long as it can be realized by a digital signal processor, and electric field levels are measured on the basis of outputs from a variable frequency digital filter 62.

A description of the same operations as those in the first embodiment will be omitted, and only a measuring operation in an electric field level measuring circuit which is different from the one in the first embodiment will be described below.

Since the squared sum of sampled data S(kT) (T=1/ sampling frequency F) stored in a memory 61 is proportional to the electric field level, the electric field level can be calculated by the following equation:

$$\text{Electric field level} = K \cdot 1/n \sum_{i=0}^{n-1} [S(kT)]^2$$

where K is the constant of proportionality.

The electric field levels of received signals from the receiving channel and the adjacent channels of the higher- and lower-frequency than the receiving channel are obtained in the same manner.

Figure 11:
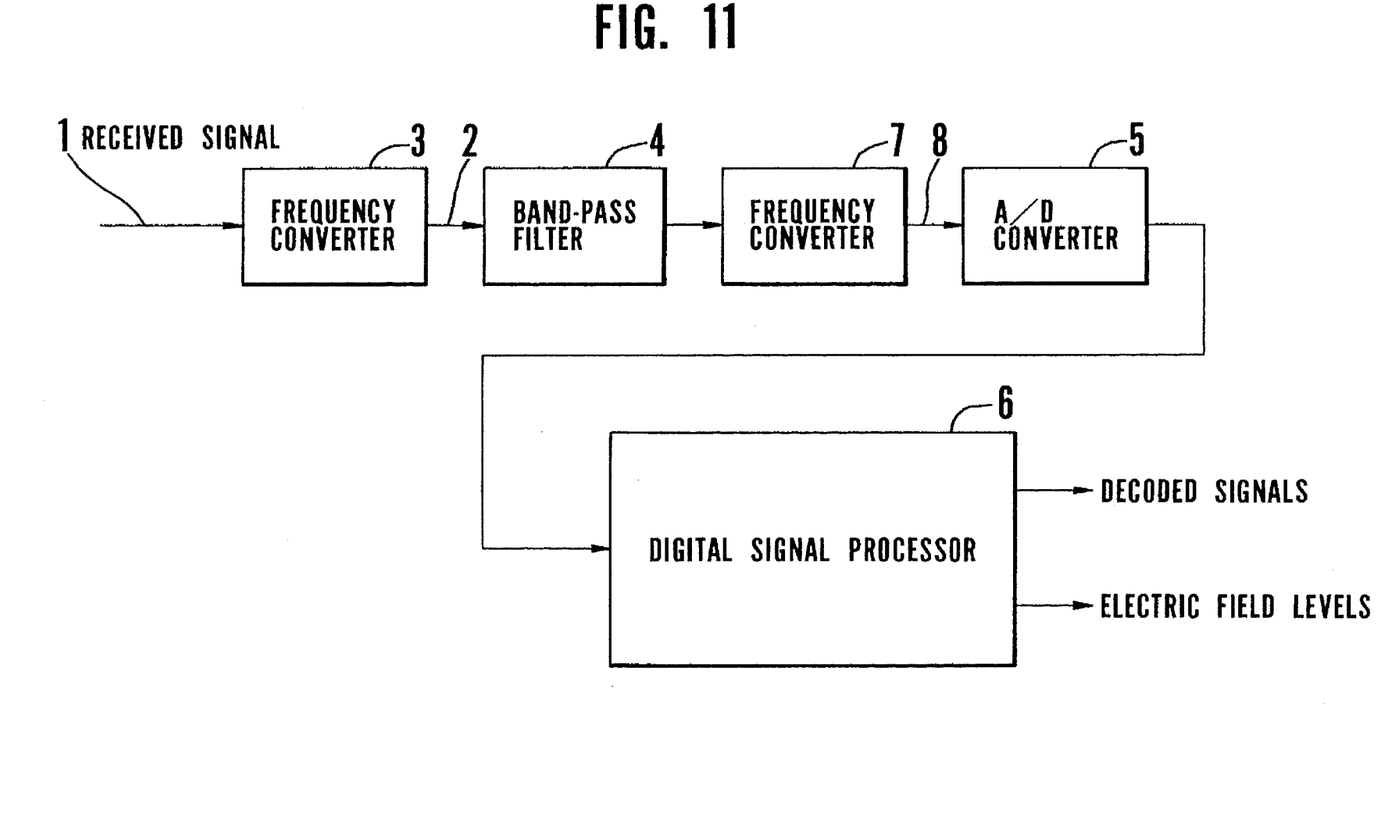
FIG. 11 is a block diagram showing a radio receiving device according to still another embodiment of the present invention.

FIG. 11 is a block diagram showing a radio receiving device according to still another embodiment of the present invention. The same reference numerals in FIG. 11 denote the same parts as in FIG. 5, and a description thereof will be omitted.

This embodiment is characterized in that after a received signal 1 is converted into a first IF signal 2 by a frequency converter 3, the first IF signal 2 is further converted into a second IF signal 8 having a lower frequency, and the second IF signal 8 is converted into a digital signal by an A/D converter 5. The circuit arrangement of a digital signal processor 6 is the same as that shown in FIG. 5 or 10.

Since a second frequency converter 7 is intended to further decrease the frequency of the first IF signal converted from a received signal, the sampling rate for A/D conversion in the A/D converter 5 can be decreased, thus reducing the cost and power consumption of the A/D converter 5. In addition, the number of taps of a variable frequency digital filter constituting the digital signal processor 6 can be decreased. As a result, the subsequent demodulation processing can be facilitated.

The process of measuring the electric field levels of received signals from the receiving channel and the adjacent channels in this embodiment is completely the same as that in the two embodiments shown in FIGS. 5 and 10, and hence a description thereof will be omitted.

In the above embodiment, the digital signal processor is described as a one-chip circuit. However, according to the present invention, even if this digital signal processor is designed as an independent logic circuit, a radio receiving device similar to the device described above can be realized.

As has been described above, the present invention is effective in measuring the electric field levels of adjacent channels with a small number of components and a small-scale arrangement. Especially, when the present invention is to be applied to a digital modulation/demodulation scheme, since demodulation is performed by a digital signal processor after conversion is performed by an analog/digital converter in many cases, new components need not be added for measurement of electric field levels. Hence, the present invention is also advantageous in this regard.

The radio receiving device of the present invention can be used in a base station or a mobile station for mobile communication. It is, however, apparent that the present invention is not limited to mobile communication. For example, the present invention can be applied to a system in which changes in traffic occur in a microwave trunk line.

What is claimed is:

1. A radio receiving device, comprising:
   a frequency converter for converting signals received on a receiving channel and adjacent channels of higher- and lower-frequencies than the receiving channel into IF signals;
   a band-pass filter for passing the IF signals on the receiving channel and the adjacent channels;
   an A/D converter for converting an output signal from said band-pass filter into a digital signal; and
   a digital signal processor for switching a frequency band to the receiving channel and the adjacent channels of the higher- and lower-frequencies, for sequentially switching the frequency band to the receiving channel and the adjacent channels on the higher- and lower-frequencies and calculating electric field levels of the received signals of the respective channels on the basis of digital signals output from said A/D converter, wherein said digital signal processor comprises:

a variable frequency digital filter for switching a frequency band to the receiving channel and the adjacent channels of higher- and lower-frequencies;

a demodulator for demodulating a digital received signal passing through said variable frequency digital filter; and an electric field level measuring circuit for measuring an electric field level of a received signal on the basis of an output from said demodulator.

2. A device according to claim 1, wherein said demodulator is a quadrature demodulator.

3. A device according to claim 1, wherein said digital signal processor includes a decoder for decoding an output from said demodulator.

4. A radio receiving device, comprising:

a frequency converter for converting signals received on a receiving channel and adjacent channels of higher- and lower-frequencies than the receiving channel into IF signals;

a band-pass filter for passing the IF signals on the receiving channel and the adjacent channels;

an A/D converter for converting an output signal from said band-pass filter into a digital signal; and a digital signal processor for switching a frequency band to the receiving channel and the adjacent channels of the higher- and lower-frequencies, for sequentially switching the frequency band to the receiving channel and the adjacent channels on the higher- and lower-frequencies and calculating electric field levels of the received signals of the respective channels on the basis of digital signals output from said A/D converter, wherein said digital signal processor comprises:

memory means for storing a digital received signal output from said A/D converter;

a variable frequency digital filter for switching a frequency band to the receiving channel and the adjacent channels of higher- and lower-frequencies;

switching control means for switching a pass band of said variable frequency digital filter to the receiving channel and the adjacent channels of higher- and lower-frequencies;

a demodulator for demodulating a digital received signal passing through said variable frequency digital filter; and an electric field level measuring circuit for measuring an electric field level of a received signal on the basis of an output from said demodulator.

5. A device according to claim 4, wherein said digital signal processor includes a decoder for decoding an output from said demodulator.

6. A radio receiving device comprising:

a frequency converter for converting signals received on a receiving channel and adjacent channels of higher- and lower-frequencies than the receiving channel into IF signals;

a band-pass filter for passing the IF signals on the receiving channel and the adjacent channels;

an A/D converter for converting an output signal from said band-pass filter into a digital signal; and a digital signal processor for switching a frequency band to the receiving channel and the adjacent channels of the higher- and lower-frequencies, for sequentially switching the frequency band to the receiving channel and the adjacent channels on the higher- and lower-frequencies and calculating electric field levels of the received signals of the respective channels on the basis of digital signals output from said A/D converter, wherein said digital signal processor comprises:

a variable frequency digital filter for switching a frequency band to the receiving channel and the adjacent channels of higher- and lower-frequencies; and an electric field level measuring circuit for measuring an electric field level of a received signal on the basis of a digital received signal passing through said variable frequency digital filter.

7. A device according to claim 6, wherein said digital signal processor further comprises:

a demodulator for demodulating a digital received signal passing through said variable frequency digital filter; and a decoder for decoding an output from said demodulator.

8. A radio receiving device, comprising:

a frequency converter for converting signals received on a receiving channel and adjacent channels of higher- and lower-frequencies than the receiving channel into IF signals;

a band-pass filter for passing the IF signals on the receiving channel and the adjacent channels;

an A/D converter for converting an output signal from said band-pass filter into a digital signal; and digital signal processing means for switching a frequency band to the receiving channel and the adjacent channels of the higher- and lower-frequencies, for sequentially switching the frequency band to the receiving channel and the adjacent channels on the higher- and lower-frequencies and calculating electric field levels of the received signals of the respective channels on the basis of digital signals output from said A/D converter;

wherein said digital signal processing means is a digital signal processor;

wherein said digital signal processor comprises:

memory means for storing a digital received signal output from said A/D converter;

a variable frequency digital filter for switching a frequency band to the receiving channel and the adjacent channels of higher- and lower-frequencies;

switching control means for switching a pass band of said variable frequency digital filter to the receiving channel and the adjacent channels of higher- and lower-frequencies; and an electric field level measuring circuit for measuring an electric field level of a received signal on the basis of a digital received signal passing through said variable frequency digital filter.

9. A device according to claim 8, wherein said digital signal processor further comprises:

a demodulator for demodulating a digital received signal passing through said variable frequency digital filter; and a decoder for decoding an output from said demodulator.

10. A radio receiving device, comprising:

a first frequency converter for converting signals received on a receiving channel and adjacent channels of higher- and lower-frequencies than the receiving channel into first IF signals;

a band-pass filter for passing the first IF signals on the receiving channel and the adjacent channels;

a second frequency converter for converting an output signal from said band-pass filter into a second IF signal having a frequency lower than frequencies of the first IF signals;

an A/D converter for converting said second IF signal output from said second frequency converter into a digital signal; and a digital signal processor for switching a frequency band to the receiving channel and the adjacent channels of higher- and lower-frequencies, for sequentially switching the frequency band to the receiving channel and the adjacent channels of higher- and lower-frequencies and calculating electric field levels of the received signals of the respective channels on the basis of digital signals output from said A/D converter, wherein said digital signal processor comprises:

a variable frequency digital filter for switching a frequency band to the receiving channel and the adjacent channels on the higher- and lower-frequencies;

a demodulator for demodulating a digital received signal passing through said variable frequency digital filter; and an electric field level measuring circuit for measuring an electric field level of a received signal on the basis of an output from said demodulator.

11. A device according to claim 10, wherein said demodulator is a quadrature demodulator.

12. A radio receiving device comprising:

a first frequency converter for converting signals received on a receiving channel and adjacent channels of higher- and lower-frequencies than the receiving channel into first IF signals;

a band-pass filter for passing the first IF signals on the receiving channel and the adjacent channels;

a second frequency converter for converting an output signal from said band-pass filter into a second IF signal having a frequency lower than frequencies of the first IF signals;

an A/D converter for converting said second IF signal output from said second frequency converter into a digital signal; and a digital signal processor for switching a frequency band to the receiving channel and the adjacent channels of higher- and lower-frequencies, for sequentially switching the frequency band to the receiving channel and the adjacent channels of higher- and lower-frequencies and calculating electric field levels of the received signals of the respective channels on the basis of digital signals output from said A/D converter, wherein said digital signal processor comprises:

memory means for storing a digital received signal output from said A/D converter;

a variable frequency digital filter for switching a frequency band to the receiving channel and the adjacent channels of higher- and lower-frequencies;

switching control means for switching a pass band of said variable frequency digital filter to the receiving channel and the adjacent channels of higher- and lower-frequencies;

a demodulator for demodulating a digital received signal passing through said variable frequency digital filter; and an electric field level measuring circuit for measuring an electric field level of a received signal on the basis of an output from said demodulator.

13. A radio receiving device, comprising:

a first frequency converter for converting signals received on a receiving channel and adjacent channels of higher- and lower-frequencies than the receiving channel into first IF signals;

a band-pass filter for passing the first IF signals on the receiving channel and the adjacent channels;

a second frequency converter for converting an output signal from said band-pass filter into a second IF signal having a frequency lower than frequencies of the first IF signals;

an A/D converter for converting said second IF signal output from said second frequency converter into a digital signal; and a digital signal processor for switching a frequency band to the receiving channel and the adjacent channels of higher- and lower-frequencies, for sequentially switching the frequency band to the receiving channel and the adjacent channels of higher- and lower-frequencies and calculating electric field levels of the received signals of the respective channels on the basis of digital signals output from said A/D converter, wherein said digital signal processor comprises:

a variable frequency digital filter for switching a frequency band to the receiving channel and the adjacent channels of higher- and lower-frequencies; and an electric field level measuring circuit for measuring an electric field level of a received signal passing through said variable frequency digital filter.

14. A radio receiving device, comprising:

a first frequency converter for converting signals received on a receiving channel and adjacent channels of higher- and lower-frequencies than the receiving channel into first IF signals;

a band-pass filter for passing the first IF signals on the receiving channel and the adjacent channels;

a second frequency converter for converting an output signal from said band-pass filter into a second IF signal having a frequency lower than frequencies of the first IF signals;

an A/D converter for converting said second IF signal output from said second frequency converter into a digital signal; and a digital signal processor for switching a frequency band to the receiving channel and the adjacent channels of higher- and lower-frequencies, for sequentially switching the frequency band to the receiving channel and the adjacent channels of higher- and lower-frequencies and calculating electric field levels of the received signals of the respective channels on the basis of digital signals output from said A/D converter, wherein said digital signal processor comprises:

memory means for storing a digital received signal output from said A/D converter;

a variable frequency digital filter for switching a frequency band to the receiving channel and the adjacent channels of higher- and lower-frequencies;

switching control means for switching a pass band of said variable frequency digital filter to the receiving channel and the adjacent channels of higher- and lower-frequencies; and an electric field level measuring circuit for measuring an electric field level of a received signal on the basis of a digital received signal passing through said variable frequency digital filter.

* * * * *